US009639293B2

(12) United States Patent
Guo et al.

(10) Patent No.: US 9,639,293 B2
(45) Date of Patent: May 2, 2017

(54) MIGRATION OF NEWLY ALLOCATED DATA TO A STORAGE TIER

(71) Applicant: International Business Machines Corporation, Armonk, NY (US)

(72) Inventors: Yong Guo, Shanghai (CN); Bruce McNutt, Gilroy, CA (US); Tao Tang, Shanghai (CN); Yan Xu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/151,529

(22) Filed: May 11, 2016

(65) Prior Publication Data

US 2016/0253121 A1 Sep. 1, 2016

Related U.S. Application Data

(63) Continuation of application No. 14/327,190, filed on Jul. 9, 2014, now Pat. No. 9,372,630.

(51) Int. Cl.
*G06F 13/10* (2006.01)
*G06F 3/06* (2006.01)

(52) U.S. Cl.
CPC .......... *G06F 3/0647* (2013.01); *G06F 3/0611* (2013.01); *G06F 3/0619* (2013.01); *G06F 3/0685* (2013.01); *G06F 3/0688* (2013.01); *G06F 3/0689* (2013.01); *G06F 3/0665* (2013.01)

(58) Field of Classification Search
CPC ............................ G06F 3/0647; G06F 3/0689
USPC ........................................................ 711/114
See application file for complete search history.

(56) References Cited

U.S. PATENT DOCUMENTS 8,055,938 B1 * 11/2011 Chatterjee .......... G06F 11/1084 714/6.21
8,255,625 B2 8/2012 Galloway et al.
8,375,180 B2 2/2013 Chiu et al.
8,443,241 B2 5/2013 Chiu et al.
2013/0275653 A1 10/2013 Ranade et al.
2013/0290598 A1 10/2013 Fiske et al.
2013/0297872 A1 11/2013 Hyde, II et al.
2016/0011803 A1 1/2016 Guo et al.

FOREIGN PATENT DOCUMENTS

WO 2008007348 A1 1/2008
WO 2012004837 A1 1/2012

OTHER PUBLICATIONS

Babineau et al., "Creating Information Management Leverage with Veritas Storage Foundation by Symantec", Intelligent Information Management Brief, Enterprise Strategy Group, Sep. 2006, pp. 1-3.

(Continued)

*Primary Examiner* — Jae Yu
(74) *Attorney, Agent, or Firm* — Peter J. Edwards

(57) ABSTRACT

A method, for migrating newly allocated data into a second storage tier, includes receiving a request to store a data item. The method includes allocating an extent to a first storage tier to store the new data item. The method includes determining whether an extent is newly allocated on the first storage tier. The method includes migrating, by avoiding a learning phase, the newly allocated extent to the second storage tier from the first storage tier.

4 Claims, 4 Drawing Sheets

210
New Order
214
NETWORK 212
Host Server
200
Storage Server
New Data Allocation
208
Tiered Storage
232
230
SSD Tier 224
ENT Tier 226
SATA Tier 228
Quick Promote
MONITORING MODULE 220
New data detect
MIGRATION MODULE 222
Request Data Migration
TIERED STORAGE MANAGER 216

(56) References Cited

OTHER PUBLICATIONS

Gsoedl, J., "Dynamic storage tiering options", Tech Target, SearchStorage.com, First published Aug. 2010, Accessed/Printed Feb. 19, 2014, 17 pages, Copyright 2000-2014 TechTarget. http://searchstorage.techtarget.com/tip/Dynamic-storage-tiering-options.

Tech Target, "Tiered storage tutorial", Tech Target, SearchStorage.com, First published Mar. 2009, Accessed/ Printed Feb. 19, 2014, 18 pages, Copyright 2000-2014 Tech Target. http://searchstorage.techtarget.com/tutorialiTiered-storage-tutorial.

List of IBM Patents or Patent Applications Treated as Related, May 9, 2016, 2 pages.

* cited by examiner

MIGRATION OF NEWLY ALLOCATED DATA TO A STORAGE TIER

BACKGROUND

The present disclosure relates to data storage systems, and more specifically, to migrating data within data storage systems.

A data storage system can have one or more storage tiers in one or more storage devices. Tiered storage is a data storage environment consisting of two or more kinds of storage devices delineated by differences in at least one of these four attributes: price, performance, capacity and function. Any significant difference in one or more of the four defining attributes can be sufficient to justify a separate storage tier.

Extents can be managed on tiered storage. An extent is a contiguous area of storage in a storage system. A tiered storage system may move extents between tiers to optimize its performance and capacity needs.

SUMMARY

Embodiments of the present disclosure are related to a method, a system, and a computer program product for migrating newly allocated data into a second storage tier.

One embodiment is directed toward a method for migrating newly allocated data into a second storage tier. The method includes receiving a request to store a data item. The method includes allocating an extent to a first storage tier to store the data item. The method includes determining whether an extent is newly allocated on the first storage tier. The method includes migrating, by avoiding a learning phase, the newly allocated extent to the second storage tier from the first storage tier.

Another embodiment is directed toward a computer system for use with a computer that is configured to migrate newly allocated data into a second storage tier. The computer system comprises a plurality of storage devices arranged into at least a first storage tier and a second storage tier. The computer system also comprises one or more computer processor circuits. The computer processor circuit is configured to receive a request to store a data item. The computer processor circuit is also configured to allocate an extent to the first storage tier to store the new item. The computer processor circuit is also configured to determine whether an extent is newly allocated. The computer processor circuit is also configured to migrate, by avoiding a learning phase, the newly allocated extent to the second storage tier from the first storage tier.

Another embodiment is directed toward a computer program for migrating newly allocated data into a second storage tier. The computer program product includes a computer readable storage device having a computer readable program stored therein, wherein the computer readable program, when executed on a computing device, causes the computing device to receive a request to store a data item. The computer readable program also causes the computing device to allocate an extent to a first storage tier. The computer readable program also causes the computing device to determine whether an extent is newly allocated on the first storage tier. The computer readable program also causes the computing device to migrate, while avoiding a learning phase, the newly allocated extent to the second storage tier from the first storage tier.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
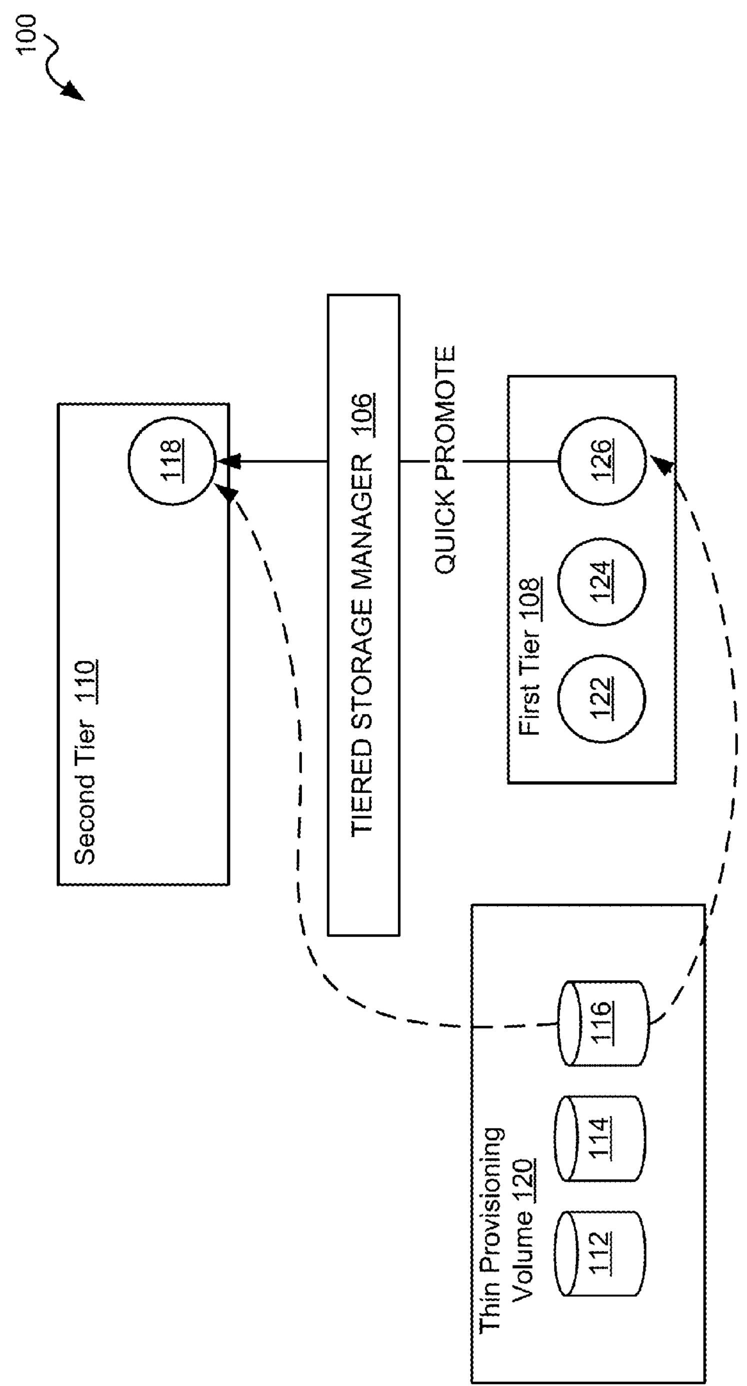
FIG. 1 illustrates a block diagram of a storage system that migrates extents across storage tiers, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to data storage systems, and more specifically, to migrating data within data storage systems. For instance, aspects of the present disclosure can relate to receiving a data item within a tiered storage system. The tiered storage system can allocate an extent for the data item to a storage device in a first storage tier. The newly allocated extent can be migrated to a second storage tier while avoiding the learning phase of tiered storage system. While the present disclosure is not necessarily limited to such applications, various aspects of the disclosure may be appreciated through a discussion of various examples using this context.

In tiered storage, the individual tiers in the storage system may be managed by a tiered storage manager that implements storage functions. The tiered storage manager may migrate data from one storage tier to another storage tier. Within each storage tier, there may be one or more ranks within the tier to assist in managing the extents within the tier.

The tiered storage system may utilize extents to store data. Even though reference is made to extents throughout this disclosure, extents can refer broadly to data in any logical or physical granularity. For example, within a volume there may be sectors, segments, data blocks, or extents. A hard drive write to data bits or data blocks. Extents may be a continuous area of storage within the storage system. An extent may refer to a logical extent, which can be a small granularity within a volume. Various levels of granularity may exist within the volume. For example, the levels of granularity may include a segment or a data block.

The term logical extent and physical extent may also be used to distinguish between logical aspects of storage and the physical aspects of storage on physical drives. The logical extent can contain pointers that refers to a physical extent, which is a continuous region of computer storage medium on a storage device reserved for the physical extent. For purposes of simplicity, the relationship between the size of the logical extent to the physical extent is assumed to be one to one, but other configurations are contemplated. A logical extent that is not mapped or does not point to a physical extent may be considered unallocated while a logical extent that is mapped or points to a physical extent may be considered allocated. When a data item is written to the logical extent, the data item may be written to the physical extent and the logical extent may point to the physical extent.

The tiered storage system can migrate extents within a storage tier based on extent performance. A migration may involve migrating the physical extent to a second storage device from a first storage device while changing the reference in the logical extent. Throughout the disclosure, both the physical and logical extent may both be referred to as an extent.

In various embodiments, newly allocated data is usually hot data, i.e., frequently used data that users will continue accessing until the data is no longer useful. For example, a system that performs electronic commerce transactions may access a customer order frequently until the order is fulfilled, then the customer order may be accessed sporadically, i.e., cold data. A typical example of the aforementioned one-time "hot" data exists in the Express Industry. Data may be created at the beginning of a deal. This data is hot in the following day since, for example, it may be accessed repeatedly by a customer to query a status of the deal. Once the deal is completed, it is quite possible that the data would never be accessed/used.

In existing tiered storage systems, the newly allocated data is allocated on the slower storage device and needs to go through at least one learning period where the hot data is identified and then migrated to a higher performance storage device. The storage system could perform a learning operation which would occur during a learning period. The learning operation evaluates the frequency that a physical extent is accessed by the storage system and, based on the frequency, migrates various physical extents within the storage system in an optimal manner. The learning operation can take time. For example, the learning period may take up to 24 hours to promote data.

Aspects of the present disclosure can relate to avoiding the learning window by automatically promoting newly allocated data in a tiered storage system. The learning operation may be bypassed and the newly created data may be automatically promoted which can be beneficial in circumstances where new data will likely be hot data (i.e., frequently accessed)

FIG. 1 illustrates a block diagram of a storage system 100 that migrates extents across storage tiers, according to various embodiments. The storage system 100 can have one or more storage tiers with one or more storage tiers having one or more storage devices. The storage tiers can have different performance levels. For example, one storage tier, e.g., the second tier 110, can have a higher relative performance than another storage tier, e.g., the first tier 108, which can be measured using performance metrics such as access times, or access frequencies. For example, the first tier 108 may be a Serial Advanced Technology Attachment (SATA) hard drive having a particular rotation speed. The second tier 110 can refer to a Solid State Drive (SSD). The storage system 100 can have two storage tiers, an second tier 110 and a first tier 108. A tiered storage manager 106 manages the migration of extents within the storage system 100. The storage system 100 can be referred to as a storage server, according to various embodiments. The storage system 100 can also have a thin provisioning volume 120. The thin provisioning volume 120 is a logical construct and its logical extents can be mapped to physical extents on the second tier 110 and first tiers 108.

The storage system 100 may store data logically to extents in the thin provisioning volume 120. In the example set forth in storage system 100, the reserved space, e.g., logical extent 116, can be the logical repository for the data. The other space, e.g., extent 112, and extent 114, can be already allocated with physical extents, 122 and 124 respectively within the storage system 100. The extent 116 can receive the data and be allocated/written to storage devices in the first tier 108. The data from extent 116 can be written to data store 126 in the first tier 108 as a default setting. The first tier 108 can also have physical extent 122, and physical extent 124.

The second tier 110 can have one or more data stores. For the purposes of simplicity, data store 118 is shown. In a thin-provisioning volume, an extent, e.g., extent 116, can be reserved for incoming data. When data is written to the first tier 108, a metadata flag can be included with the reserved unallocated extent 116. The metadata flag can be responsive to whether an extent 116 is allocated onto a storage device in the first tier 108. The storage system 100 can scan the data from the thin-provisioning volume at each running cycle. Once the tiered storage manager 106 finds the allocation, the metadata flags changes from unallocated to allocated (e.g., when new data is allocated to a data store/physical extent), then the tiered storage manager 106 can record the extent 116 as newly allocated.

The tiered storage manager 106 can automatically promote the physical extent 126 associated with extent 116 to the second tier 110. The promotion of extent 116 can occur by copying the physical extent 126 to physical extent 118 through the tiered storage manager 106. If the second tier 110 does not have enough space to accommodate the physical extent 118, then the tiered storage manager 106 can demote an extent from the second tier 110 to the first tier 108. The second tier 110 can request to demote any extent, or swap the extent. Other extent management actions are contemplated including promote, or a cascading migration. The request can be made to the tiered storage manager 106.

Figure 2:
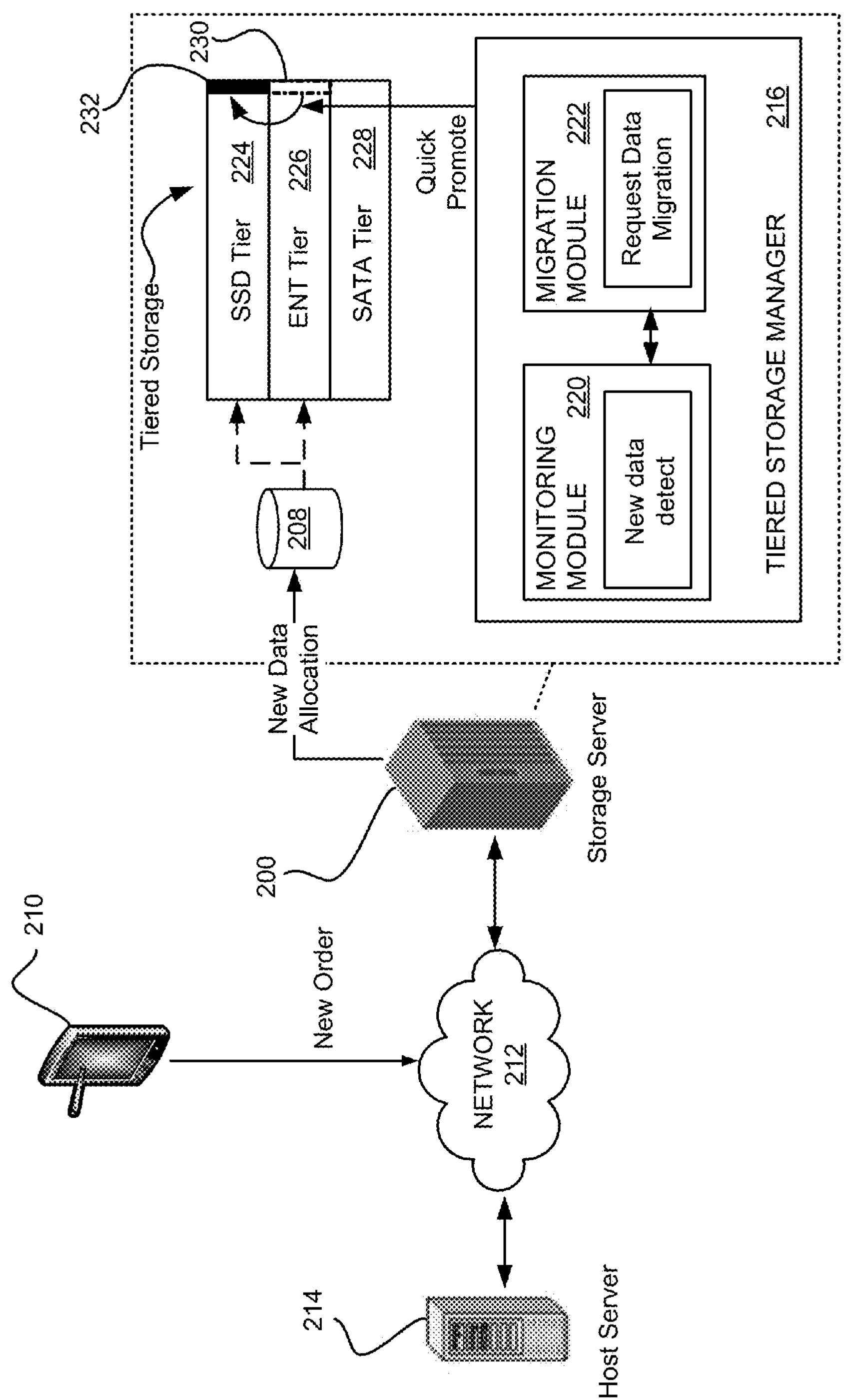
FIG. 2 illustrates a work flow diagram of storage server that migrates newly allocated extents to a higher storage tier, according to various embodiments.

FIG. 2 illustrates a work flow diagram of storage server 200 that migrates newly allocated data to a higher storage tier, according to various embodiments. The newly allocated data can be detected and the newly allocated data can be promoted to a higher performance tier.

New data can be illustrated using a new customer order for an e-commerce application. The new customer order can be generated by a computing device 210. New data can also be exemplified by a tracking system for a package where the tracking information is relevant primarily before the package is delivered. The new customer order can be written to a logical extent, e.g., extent 208, which points to a location in a storage device within a storage server 200. The computing device 210 can be a device that processes, generates or receives a new order. The computing device 210 can be a mobile device, e.g., a cell phone, personal digital assistant, smart phone, or a tablet computer, or a general purpose computing device, e.g., a personal computer, virtual machine, or a laptop. The computing device 210 can send the new order though the network 212 to a host server 214.

The network 212 can be any system that facilitates communication between one or more computing devices 210. The network 212 can include an internet, intranet, in a wired or wireless configuration. The network 212 can connect to a host server 214. The computing device 210 can send a new order to the host server 214. The host server 214 can generate any number of storage operations for the storage server 200. In one embodiment, the storage operation can be a read or a write operation. The storage server 200 can manage the multiple drives or tiers of storage for a given data. For example, the storage server 200 can assign a particular storage drive to hold the data.

The storage server 200 stores the data item from the new order. A storage server can have one or more storage tiers in a tiered storage configuration and be managed by a tiered storage manager 216. The tiered storage manager 216 can manage the movement of data within the storage server 200. In various embodiments, the tiered storage manager 216 can also migrate data within the storage server 200. Aspects of the tiered storage manager 216 can involve detecting newly allocated data within device storage tier and request a data migration to a higher performing storage tier in response to detecting newly allocated data.

In various embodiments, data from the new order can be associated with a logical extent 208. The storage server 200 can allocate the physical bits to one or more storage devices. The tiered storage can include one or more storage tiers with each storage tier having one or more storage devices. The storage tier can vary according to the performance. For example, a Solid State Drive (SSD) tier 224 may include one or more fast-access SSD's. An enterprise (ENT) tier 226 may include ENT storage devices. A Serial Advanced Technology Attachment (SATA) tier 228 may include SATA storage devices. The storage tiers may vary in performance from one another. For example, an SSD tier 224 can be higher performance than an ENT tier 226. In various embodiments, the hard drives in the ENT tier 226 can have a higher performance that those in the SATA tier 228. For example, the ENT tier 226 may have hard drives that run at 10 k-15 k rpm while the SATA tier 228 have hard drives that run at 7.2 k rpm.

The storage server 200 may automatically allocated new data items to be allocated on storage devices on a particular tier, e.g., the ENT tier 226. For purposes of illustration, the ENT tier 226 is the default tier but the default tier could also be the SATA tier 228. The newly allocated data may be illustrated in physical extent 230. The tiered storage manager 216 can have a monitoring module 220 and a migration module 222. The monitoring module 220 can monitor the storage devices for newly allocated data. This may occur in a variety of ways. For example, the monitoring module 220 can detect a newly allocated data with a metadata tag on a volume or extent 208. The metadata tag can communicate to the monitoring module 220 that the data within extent 208 is allocated.

According to various embodiments, the migration module 222 can be a part of the tiered storage manager 216. The migration module 222 can request to the tiered storage manager 216 to migrate the newly allocated physical extent 230 to the physical extent 232 in the SSD tier. As mentioned herein, extent 230 and extent 232 can be one or more data bits that correspond to the physical element of a storage device. From a storage perspective, the physical extent can be the same size as the logical extent. When extent 230 is migrated to 232, the pointer in extent 208 can be updated.

Under a type of configuration, the tiered storage manager 216 may evaluate any new data to be promoted based on a learning phase, according to various embodiments. The learning phase can observe the newly allocated data and evaluate the performance of the newly allocated data to determine how to best migrate the newly allocated data between the various tiers. Aspects of the present disclosure can provide for a method for the migration module 222 to avoid the learning phase of the tiered storage manager 216 and immediately promote the physical extent 230 to a higher tier, e.g., the SSD tier 224.

Figure 3:
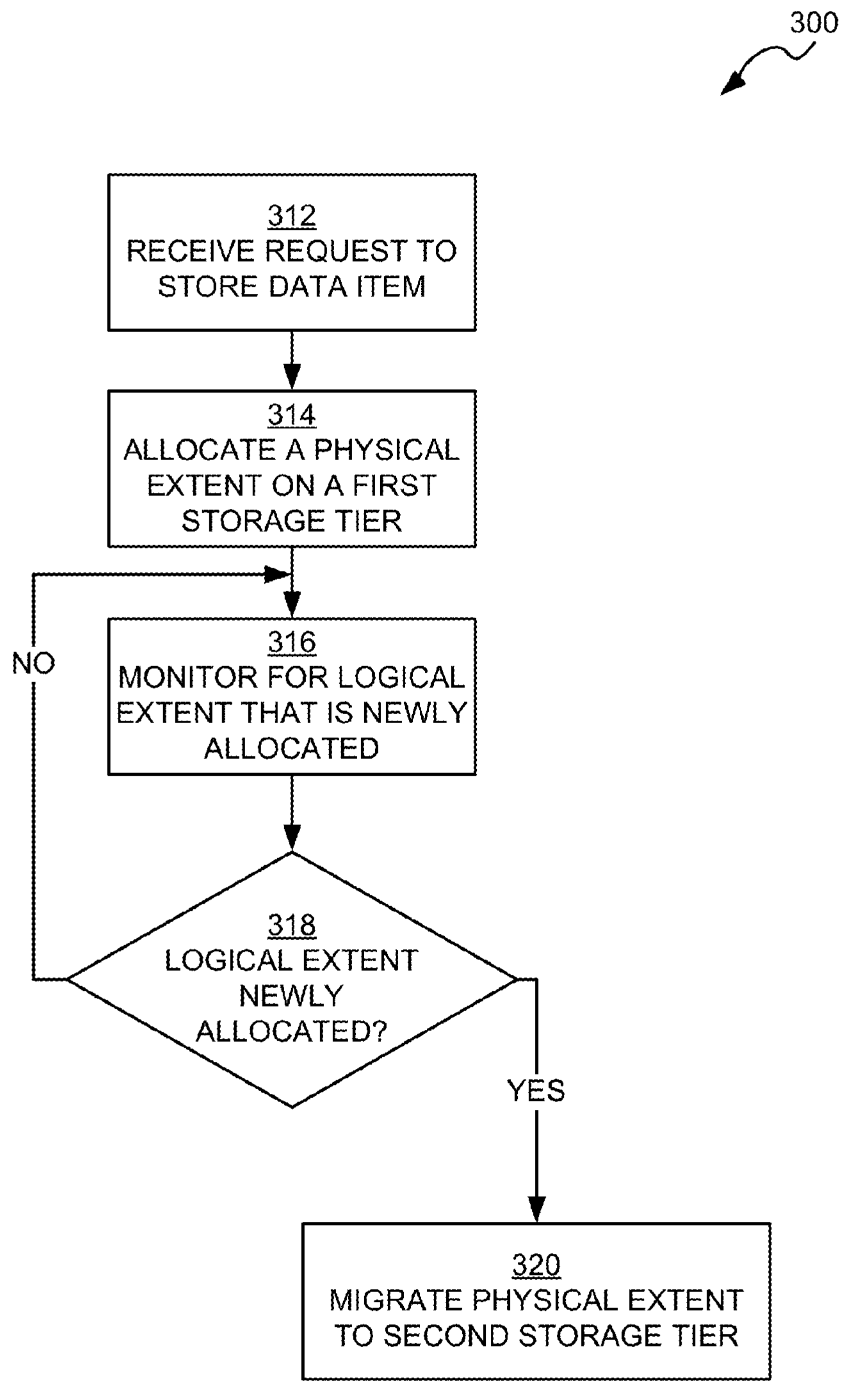
FIG. 3 illustrates a flowchart of a method for migrating newly allocated extents to a higher performance storage tier from the initial storage tier, according to various embodiments.

FIG. 3 illustrates a flowchart of a method 300 for migrating newly allocated data to a higher performance storage tier from the initial storage tier, according to various embodiments. The method 300 can involve monitoring the storage device for a newly allocated extent and promoting the newly allocated extent to a higher storage tier without undertaking the learning phase of a tiered storage application. The method 300 may begin in operation 312. Aspects of the present disclosure may be performed by a tiered storage manager on a storage server. The tiered storage manager can control the migration of data in the tiered storage as well as provide updates to the monitoring module. In various embodiments, the tiered storage manager may be responsible for operation 312 through operation 320. The monitoring module of the tiered storage manager can be responsible for operation 316 through operation 318. The migration module can be responsible for operation 320.

In operation 312, the tiered storage manager can receive a request to store a data item. The request can originate from a host server or other entity responsible for creating new data. Once the tiered storage manager receives a request to store a data item, the tiered storage manager can automatically search for available space within the supported storage devices. The data item can be a data entry and may be logically assigned to an extent managed by the storage controller. The tiered storage manager may migrate various data in the extent throughout the storage tiers. Once the request is received, then the method 300 continues to operation 314.

In operation 314, if there is available space, then the data item can be allocated to physical data bits (i.e., a physical extent) on a storage device which can be mapped to a volume or various granularities of a volume (e.g., an logical extent). In various embodiments, the tiered storage manager can allocate a data store/physical extent (i.e., data bits) on the storage device in the first storage tier (i.e., an initial storage tier) for the data item. In various embodiments, the tiered storage manager can attach a metadata flag to the logical extent that indicates the logical extent is newly allocated. The method 300 can continue to operation 316.

In operation 316, the monitoring module can monitor for a newly allocated logical extent. The monitoring module may be responsible for monitoring a storage system. Part of the monitoring may also include identifying newly allocated logical extents on the volume. The monitoring module may also use functions of the tiered storage manager to monitor the volumes. In operation 318, the monitoring module can determine whether the logical extent is newly allocated, i.e., points to a physical extent. The newly allocated logical extent on the storage device can be detected in a variety of methods. For example, a metadata flag can be attached to the logical extent by the tiered storage manager as part of the write process. An indication from the metadata flag can indicate that the physical extent is allocated to a storage device and thus the logical extent is newly allocated. The monitoring module can detect the newly allocated logical extent by detecting the metadata flag from the logical extent. In various embodiments, the monitoring module can scan for the metadata flag as part of a read operation. For example, the scanning may include scanning the volume for the metadata flag and, once detected, marking the logical extent with the metadata flag as newly allocated data. In various embodiments, once the logical extent is identified as newly allocated, the fact that the logical extent is newly allocated can be recorded into storage, e.g., a memory of a computer, or page file, so that the listing of newly allocated logical extents can be quickly retrieved by the storage system.

If the logical extent is newly allocated, then the tiered storage manager can receive a notification that the logical extent is newly allocated. The notification can be a system alert or an alarm to call attention to the newly allocated logical extent. The tiered storage manager can simply note the newly allocated logical extent and continue with a migration action described herein in operation 320. If there is no indication of newly allocated data, then the method 300 can continue to operation 316 where newly allocated logical extent can be monitored.

In operation 320, the migration module can migrate, while avoiding a learning phase, the physical extent associated with the logical extent to the second storage tier from the first storage tier. The second storage tier can be a higher performance storage tier than the first storage tier and the migration may be a promotion of the data to a higher performance storage tier. Higher performance can refer to the access time for the storage device. For example, an SSD will have a much faster access time than an SATA drive. Higher performance can also refer to the overall data transfer rate with a higher data transfer equaling a higher performance.

In various embodiments, the migration module can generate a promotion path, e.g., a plan to promote the data to a higher level. For example, a data item may be written to a first storage tier as a default write location. Once identified by the migration module as newly allocated, then the data can be selected for promotion to a higher performance or second storage tier. In various embodiments, the migration module can generate the promotion path which is implemented by another component of the storage controller. Otherwise, the migration module can directly be responsible for the migration of data within the storage server.

Various data may have to be rearranged within the storage tiers to accommodate the migrated data. For example, a physical extent in the second storage tier may have to be demoted to the first storage tier in order for the physical extent associated with the data item to be promoted to the second storage tier. In various embodiments, the tiered storage manager can monitor for performance degradation in the second storage tier. The performance degradation can include an increase in the read time or write time of a physical extent in the second storage tier. Assuming that the second storage tier is close to capacity, then the tiered storage manager can also demote cold data from the second storage tier to the first storage tier. The tiered storage manager can demote cold data in response to performance degradation in the second storage.

In various embodiments, the migration module may make recommendations on the path. Once the promotion path is generated, then the tiered storage manager may implement the recommended path. In various embodiments, the tiered storage manager may also receive information that the logical extent is newly allocated. For example, the tiered storage manager may automatically migrate the physical extent in response to receiving the physical extent on new tier.

In various embodiments, the performance of the storage system may be improved by avoiding the learning phase where extents are selected for migration. By avoiding the learning phase and promoting newly allocated physical extents to a higher tier immediately, the processing resources of the storage system may be preserved. For example, if the tiered storage manager does not have to examine each extent to evaluate whether the extent should be migrated, then the processing resources used by the tiered storage manager may be more than if the newly created extents are migrated immediately.

The average access time performance of the storage system may also be improved by being reduced. For example, the average access time may be based on the amount of time it takes to access an extent. Since the newly created migrated extents have a faster access time (i.e., a smaller access time value) and are accessed more frequently, the average access time may also be improved.

Figure 4:
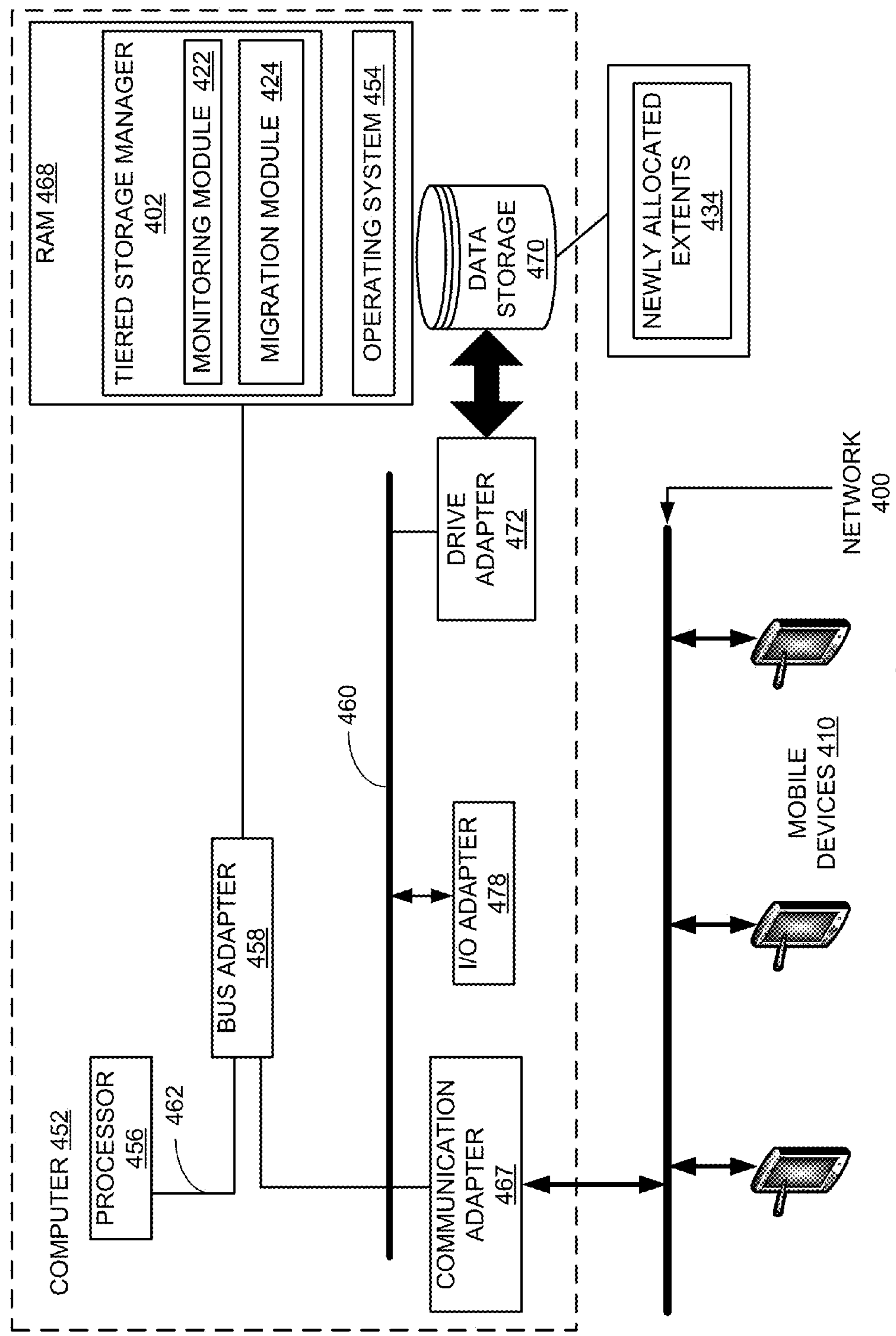
FIG. 4 illustrates a block diagram of automated computing machinery, according to various embodiments.

FIG. 4 illustrates a block diagram of automated computing machinery, according to various embodiments. The computing machinery may include example computer 452 useful in performing aspects of the disclosure, according to various embodiments. The computer 452 of FIG. 4 includes at least one computer processor 456 or 'CPU' as well as random access memory 468 ('RAM') which is connected through bus adapter 458 to processor 456 and to other components of the computer 452. The computer 452 can correspond to a storage server or storage system as referenced herein.

The RAM 468 may host a tiered storage manager 402. The computer 452 allows a tiered storage manager 402 to control data on the data storage 470 via the drive adapter 472. The tiered storage manager 402 can have a monitoring module 422 and a migration module 424. The monitoring module 422 can monitor the data storage 470 for newly allocated extents 434. The migration module 424 can migrate the newly allocated extents to another storage tier within the data storage 470. The RAM 468 may include an operating system 454. Operating systems useful for record filtering according to embodiments of the present invention include UNIX®, Linux®, Microsoft XP™, AIX®, IBM's i5/OS™, and others. The operating system 454 are shown in RAM (468), but many components of such software typically are stored in non-volatile memory also, such as, for example, on a disk drive 470.

The computer 452 may also include disk drive adapter 472 coupled through expansion bus 460 and bus adapter 458 to processor 456 and other components of the computer 452. Disk drive adapter 472 connects non-volatile data storage to the computer 452 in the form of disk drive 470. Disk drive adapters 472 that may be useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on. The data storage 470 may include one or more storage devices in a tiered or non-tiered configuration.

The data storage 470 can include one or more storage tiers of varying performance levels. The newly allocated extents 434 can exist at an initial storage tier. The newly allocated extents 434 can be detected by the monitoring module 422 and migrated to another storage tier by the migration module 424. The example computer 452 includes one or more input/output ('I/O') adapters 478. I/O adapters implement user-oriented input/output through, for example, software drivers and computer hardware for controlling output to display devices such as computer display screens, as well as user input from user input devices such as keyboards and mice (not shown). Although not pictured, the example computer 452 can include a video adapter, which is an example of an I/O adapter specially designed for graphic output to a display device such as a display screen or computer monitor. Video adapter may be connected to processor 456 through a high speed video bus, bus adapter 458, and the front side bus 462, which is also a high speed bus.

The example computer 452 includes a communications adapter 467 for data communications with other computers 410, e.g., mobile devices, and for data communications with a data communications network 400. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, an engine, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for migrating newly allocated data into a second storage tier comprising:

writing data to a first physical extent in the hard-disk-drive (HDD) storage tier;

attaching, in response to writing the data, a metadata flag to a logical extent in a set of logical extents on a thin provisioning volume, wherein the logical extent corresponds to the first physical extent and the metadata flag indicates that the first logical extent is allocated;

monitoring the set of logical extents on the thin provisioning volume for a metadata flag;

detecting, by the monitoring, the metadata flag attached to the logical extent;

migrating, in response to the detecting, the first physical extent to the solid-state-drive (SSD) storage tier;

monitoring for performance degradation in the SDD storage tier, wherein performance degradation comprises an increase in read time of a second physical extent in the SSD storage tier; and demoting cold data from the SDD storage tier to the HDD storage tier in response to performance degradation in the SDD storage, wherein the cold data is data that is not accessed frequently.

2. A computer system for migrating newly allocated data into a second storage tier comprising one or more computer processor circuits configured to perform a method comprising:

receiving a request to store a data item, wherein the data item is a delivery status of a package related to a customer order;

allocating a physical extent on a first storage tier to store the data item;

monitoring a set of logical extents for a logical extent that is newly allocated;

detecting a logical extent in the set of logical extents that is newly allocated on the first storage tier and that points to the physical extent; and migrating, in response to the logical extent being newly allocated, the physical extent to the second storage tier from the first storage tier, wherein the second storage tier exhibits a higher performance than the first storage tier.

3. A computer program product for migrating newly allocated data into a second storage tier from a first storage tier from a plurality of storage devices comprising a computer readable storage device having a computer readable program stored therein, wherein the computer readable program, when executed on a computing device, causes the computing device to:

receive a request to store a data item;

allocate a physical extent on a first storage tier to store the data item;

determine whether a logical extent associated with the physical extent is newly allocated on the first storage tier by receiving a notification that the logical extent is newly allocated; and migrate, by avoiding a learning phase and in response to the logical extent being newly allocated, the physical extent to the second storage tier from the first storage tier.

4. The computer program product of claim 3, wherein the allocating the physical extent includes:

allocating the physical extent to a reserved unallocated space on a thin provision volume of the first storage tier.

* * * * *